Figure 1:
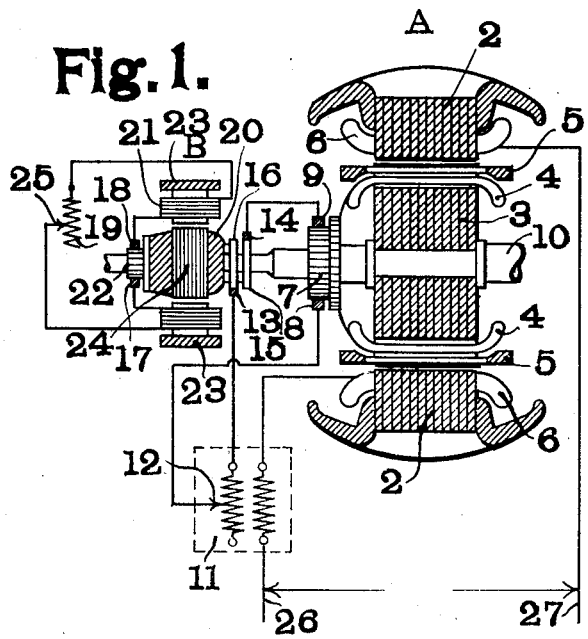

V. A. FYNN.
ALTERNATE CURRENT GENERATOR.
APPLICATION FILED MAY 23, 1911.

1,104,183.

Patented July 21, 1914.

WITNESSES:
L. L. Mead,
W. H. Alexander.

INVENTOR
Valère A. Fynn,
BY
E. E. Huffman
ATTORNEYS of Letters Patent.

UNITED STATES PATENT OFFICE.

VALÈRE ALFRED FYNN, OF LONDON, ENGLAND.

ALTERNATE-CURRENT GENERATOR.

1,104,183.

Specification of Letters Patent.

Patented July 21, 1914.

Application filed May 23, 1911. Serial No. 628,902.

*To all whom it may concern:*

Be it known that I, VALÈRE ALFRED FYNN, a subject of the King of England, residing at London, England, have invented a certain new and useful Alternate-Current Generator, of which the following is such a full, clear, and exact description as will enable any one skilled in the art to which it appertains to make and use the same, reference being had to the accompanying drawings, forming part of this specification.

My invention relates to alternate current generators and particularly to machines generating single phase currents.

It is particularly difficult to construct a single phase generator of considerable output and with a small number of poles, yet machines of this kind are often required, for instance, for direct coupling to steam turbines and the like. A single phase generator of ordinary construction requires careful designing, if a reasonable regulation is to be secured, and this difficulty is considerably increased in the case of high speed machines with few poles. It becomes necessary in such cases to use very large air gaps, thus necessitating a large amount of copper on the revolving member and therefore increasing the difficulty of its mechanical construction. It is true that the so-called asynchronous generator can be built with small air gaps but such machines as now constructed are not self-contained and require a large synchronous generator or its equivalent to be operated in parallel with them. The duty of the large synchronous generator is to supply the stator of the asynchronous generator with the large exciting volt-amperes it requires and also to determine the periodicity of the currents to be delivered by the asynchronous generator. These facts practically preclude the use of isolated asynchronous generators. Other disadvantages attaching to such machines are their inability to satisfactorily supply low power factor loads and their poor regulating properties. Generators of one, two or more phases have also been proposed in which a commuted winding on the rotor is connected to one or more of the stator windings by means of brushes and either directly or with the interposition of one or more transformers. In a single-phase shunt excited generator of this type the rotor either carries a commuted winding and a squirrel-cage or the like, or a commuted winding short-circuited by means of brushes along an axis about coinciding with that of the main stator winding. In either case, the exciting brushes connected to the main stator winding are disposed along an axis displaced by about 90 electrical degrees from the axis of the main stator winding; this arrangement has been referred to as single-phase excitation of a single-phase alternator. It has been also proposed to excite a single-phase shunt alternator constituted as just described, by means of polyphase currents derived from the stator and necessitating a correspondingly greater number of exciting brushes. Polyphase shunt alternators of this type have also been proposed with a polyphase arrangement of exciting brushes and both single and polyphase alternators of this type have been compounded by sending into the commuted rotor winding along the axis of each main stator winding a current proportional to that delivered to the mains by the corresponding main stator winding. In all such alternators the periodicity of the generated currents is however not always proportional to the rotor speed, a fact which entails many undesirable complications. I will describe my invention more particularly with reference to a single-phase alternator because the mode of operation of these machines is much more complicated than that of a polyphase generator.

The objects of this invention are to enable alternators of any number of poles, of any output and any speed to be designed with small air gaps, to simplify the construction of the revolving member or field magnet, to improve or control the regulation of such machines, to make them self-contained, and to cause the same to deliver current of a periodicity strictly proportional to the speed at which such machines are driven. I achieve these objects by making the field magnet which, as a rule will be the revolving member, of the rotor type, *i. e.*, without defined polar projections, by providing this revolving member with a winding short-circuited along a plurality of axes per pole pair, such as a squirrel cage, and by exciting this field magnet by means of an alternating current derived from an external source. In order to make such an excitation effectively possible I also provide the field magnet with a commuted winding and send the alternating exciting current into this commuted winding by way of a commutator and brushes. I prefer to derive this alternating exciting current from a dynamo electric machine the armature of which is provided with a commutator and with slip rings. It is necessary for the success of my invention that this exciter be driven at the same speed as the generator, or at a speed proportional to that of the latter. If the exciter is driven at the same speed as the generator then I prefer to provide both machines with the same number of poles. If the exciter is driven at a speed differing from that of the generator then I prefer to select for the exciter a number of poles differing from that of the generator. Thus, if the exciter is driven at twice the speed of the generator then I would provide said exciter with one-half the number of poles of the generator.

In order to automatically control the regulation of my improved alternator I insert a series transformer between the alternating exciting circuit and the main or induced circuit of the generator. In the manner above set forth I produce a self-contained alternate current generator with small air gap requiring but a small amount of exciting energy or but a few exciting volt-amperes supplying alternating current at a definite periodicity absolutely dependent on the speed at which the generator is driven and having a very close regulation practically independent of the phase difference between the E. M. F. and current delivered by the generator.

My invention will be better understood by reference to the accompanying drawings in which—

Figure 2:
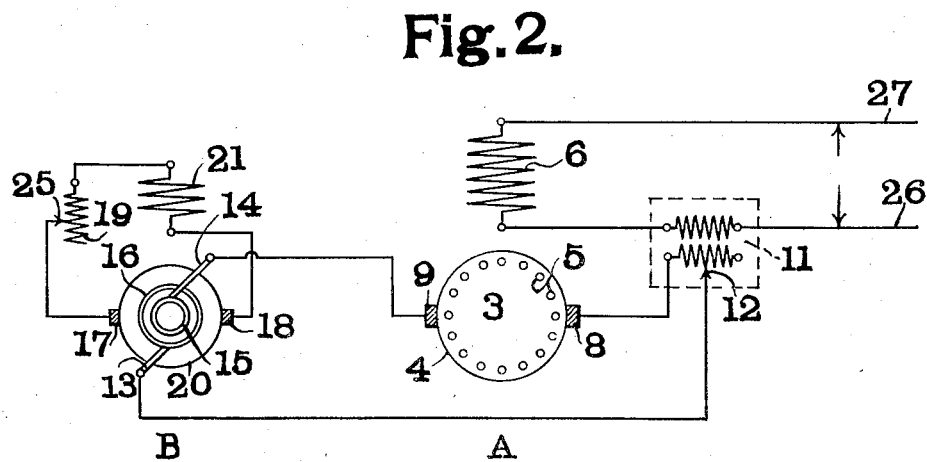

Figure 1 is a diagrammatic representation of my improved generator coupled direct to its exciter, while Fig. 2 more clearly indicates the electrical connections between the various windings on the generator and its exciter.

Referring to Figs. 1 and 2, the field magnet 3 of the generator A and the armature 24 of the auxiliary generator or exciter B are both keyed to the same shaft 10, and are both wound for the same number of poles. The generator consists of a revolving member, the mechanical construction of which is identical with that of the rotor of an induction motor. This rotor carries two independent windings. One of these is the commuted winding 4 placed in the bottom of the rotor slots and connected to the commutator 7 and the other is the squirrel cage winding 5 preferably disposed near the periphery of the revolving member. The stationary member 2 is of the ordinary stator construction i. e., without defined polar projections and carries a winding 6 embedded in slots in the usual manner. The exciter has an armature 24 carrying a commuted winding 20 connected to the commutator 22, and also connected to the slip rings 15—16. The frame 23 of this exciter is of the ordinary construction and is provided with polar projections which are energized by means of the exciting coils 21. The shunt field winding 21 of the exciter B is connected to the commutator 22 by way of the brushes 17, 18, a resistance 19 adjustable at 25 being included in this shunt exciting circuit for the purpose of adjusting or regulating the direct current excitation of the exciter B. The slip rings 15—16 of the exciter are connected to the commuted winding 4 on the field magnet of the generator by means of the brushes 9—8 resting on the commutator 7 in such a position as to conduct current through said commuted winding along an axis displaced by 90 electrical degrees from the axis of the main winding 6. The secondary of the transformer 11 is included in this alternate current exciting circuit for the purpose of regulating the voltage of the generator. The primary of the transformer 11 is connected between the line 26, 27 and the main or generating winding 6 of the alternator A. The transformation ratio of the series transformer 11 can be adjusted by means of the movable contact 12.

The mode of operation of this form of my improved generator is somewhat as follows: Suppose the generator and its exciter to be each provided with two poles and to be coupled direct as shown in Fig. 1. If such a set is driven at 1200 revolutions and the direct current exciting circuit of the exciter be closed then that machine will deliver to the field magnet 3 of the generator an alternating current of 20 cycles. Since the brushes 8 and 9 on the commutator of the generator are displaced by 90 electrical degrees from the axis of the main or generating winding 6, as shown in Fig. 2, then it will not be possible for any energy to be transmitted from the exciter B to the main generator winding 6 by way of the brushes 8 and 9 nor will it be possible for any alternating current entering the field magnet by way of said brushes to directly affect the winding 6 in any other way. The current flowing from 8 to 9, or vice versa will, however affect 6 indirectly by producing along the axis 8, 9 a 20 cycle alternating flux to which I will refer as the primary alternating flux and which will be reflected along the axis of 6. Briefly, this is brought about as follows, by rotation of the squirrel cage winding 5, or its equivalent, in this primary flux there will be generated in 5, an alternating E. M. F. which will appear along an axis coinciding with that of 6. This E. M. F. to which I will refer as the primary working E. M. F. will naturally produce a magnetizing current in 5 this current will lag behind said E. M. F. and will set up a 20 cycle secondary or reflected alternating flux, which secondary flux will be displaced from the primary flux by 90 degrees in space and time, its axis therefore coinciding with the axis of the main generating winding 6. This secondary flux will react on the alternating current exciting circuit, because by rotation in this secondary flux a certain E. M. F. will be generated in the commuted winding 4 and will appear at the brushes 8, 9. This E. M. F. is of such a direction as to oppose all the reactance E. M. F.'s in the alternating current exciting circuit, with the result that the external E. M. F. necessary to send the full exciting current through the field magnet 3 of the alternator A becomes very small and does not greatly differ from the E. M. F. which would be necessary to send a direct current of corresponding value through that same circuit. The smallest value of this exciting E. M. F. is reached when the rotor 3 of the alternator A revolves synchronously or nearly so with respect to the number of its poles and to the periodicity of the alternating current supplied by the exciter B. Thus in the case in which both machines have the same number of poles the alternating current exciting E. M. F. will be very near its smallest value when both machines run at the same speed.

The short-circuited winding 5 carrying along the axis of 6 the magnetizing current already referred to is in reality the primary of a transformer, the secondary of which is constituted by the stator winding 6. When the machine is in operation there will appear at the terminals of 6 an induced alternating E. M. F. to which I will refer as the secondary working E. M. F. The periodicity of this secondary working E. M. F. is the same as that of the alternating E. M. F. generated by the exciter B, its magnitude initially depending on the magnitude of the primary flux. If translating devices of any kind are connected to this winding 6 they will be supplied with current exactly in the same manner as from an ordinary transformer. The object of the series transformer 11 is to increase or decrease the alternating exciting current sent into the field magnet 3 of the alternator proportionally with the load on the generating winding 6, thus increasing or decreasing the primary flux. If the transformer is so connected as to increase said excitation with increasing load, then the voltage at the terminals of 6 can either be kept fairly constant with varying loads or can be made to rise with increasing load, the increased alternate current excitation making up for the usual drop in voltage to be observed in all generators and due in part to the ohmic and inductive resistance of the various windings and in part to what is known as the armature reaction of such machines.

It will be seen that in this improved machine the armature reaction is almost entirely taken care of automatically for the reason that this machine is nothing but a transformer, if only considered along the axis of the main winding 6. The drop in voltage in this machine from no load to full load is therefore mainly due to the effect of primary and secondary leakage reactances. It is easy to so design this machine as to reduce these reactances to quite small values, thus making the regulation of this generator very satisfactory even without the addition of what may be termed the compounding transformer 11.

Having fully described the nature of my invention and the manner in which it is to be performed, I wish it to be understood that I do not limit myself to the particular embodiment thereof, shown in the accompanying drawing, but aim in the appended claims to cover all such modifications as fall within the scope and the spirit of my invention.

Having fully described my invention, what I claim as new and desire to secure by Letters Patent of the United States, is:

1. An apparatus for generating alternating current comprising a main generator having an induced member provided with a single induced winding, and an inducing member provided with a commuted winding and a short-circuited winding, an auxiliary generator, means for maintaining a constant ratio between the speeds of the two generators, and means for supplying single-phase current derived from the auxiliary generator to the commuted winding of the main generator along an axis displaced by ninety electrical degrees from that of the induced winding.

2. An apparatus for generating alternating current comprising a main generator having an induced member provided with a single induced winding, and an inducing member provided with a commuted winding and a short-circuited winding, an auxiliary generator, means for maintaining a constant ratio between the speeds of the two generators, means for supplying single-phase current derived from the auxiliary generator to the commuted winding of the main generator along an axis displaced by ninety electrical degrees from that of the induced winding, and means external to the main generator for electromagnetically coupling the commuted winding and the induced winding.

3. An apparatus for generating alternating current comprising a main generator having an induced member provided with a single induced winding, and an inducing member provided with a commuted winding and a short-circuited winding, an auxiliary generator, means for maintaining a constant ratio between the speeds of the two generators, means for supplying single-phase current derived from the auxiliary generator to the commuted winding of the main generator along an axis displaced by ninety electrical degrees from that of the induced winding, and a series transformer interposed between the commuted and the induced windings.

4. An apparatus for generating alternating current comprising a main generator having an induced member provided with a single induced winding, and an inducing member provided with a commuted winding and a short-circuited winding, a single-phase self-excited auxiliary generator having slip rings, means for maintaining a constant ratio between the speeds of the two generators, and brushes on the commuted winding of the main generator displaced by ninety electrical degrees from the induced winding, said brushes being connected to the slip rings of the auxiliary generator.

In testimony whereof, I have hereunto set my hand and affixed my seal in the presence of the two subscribing witnesses.

VALÈRE ALFRED FYNN. [L. S.]

Witnesses:
    W. A. ALEXANDER,
    ELIZABETH BAILEY.